United States Patent
Chiu et al.

(10) Patent No.: US 9,630,261 B2
(45) Date of Patent: Apr. 25, 2017

(54) DRILL BIT STRUCTURE

(71) Applicant: TCT GLOBAL LIMITED, Hong Kong (CN)

(72) Inventors: Shih-Feng Chiu, Taoyuan Hsien (TW); Nick Sung-Hao Chien, Taoyuan Hsien (TW); Feng-Yu Lin, Taoyuan Hsien (TW); Ming-Yuan Zhao, Taoyuan Hsien (TW)

(73) Assignee: TCT Global Limited, Hong Kong (CN)

( * ) Notice: Subject to any disclaimer, the term of this patent is extended or adjusted under 35 U.S.C. 154(b) by 233 days.

(21) Appl. No.: 14/448,273

(22) Filed: Jul. 31, 2014

(65) Prior Publication Data

US 2015/0298219 A1  Oct. 22, 2015

(30) Foreign Application Priority Data

Apr. 16, 2014  (TW) .............................. 103113942 A (51) Int. Cl.
*B23B 51/02* (2006.01)

(52) U.S. Cl.
CPC ........ *B23B 51/02* (2013.01); *B23B 2251/406* (2013.01); *B23B 2251/426* (2013.01); *Y10T 408/9097* (2015.01)

(58) Field of Classification Search
CPC ............... B23B 2251/406; B23B 51/02; Y10T 408/9097
See application file for complete search history.

(56) References Cited

U.S. PATENT DOCUMENTS

| 7,018,143 B2 | 3/2006 | Moore | |
|---|---|---|---|
| 2013/0170920 A1* | 7/2013 | Ogawa | B23B 51/02 408/1 R |

FOREIGN PATENT DOCUMENTS

| CN | 101791717 | | 7/2011 |
|---|---|---|---|
| CN | 202028809 | | 11/2011 |
| JP | 2002144122 A | * | 5/2002 |
| JP | 2007307642 | | 11/2007 |
| TW | 201338896 | | 10/2013 |

* cited by examiner

*Primary Examiner* — Sunil K Singh
*Assistant Examiner* — Alan Snyder
(74) *Attorney, Agent, or Firm* — Muncy, Geissler, Olds & Lowe, P.C.

(57) ABSTRACT

The present invention relates to a drill bit structure which comprises a body. The body has a free end, an intermediate section and a connection end. The body comprises a first groove portion, a second groove portion, a third groove portion, a fourth groove portion and a fifth groove portion. The first groove portion is partially overlapped with the third groove portion from the free end. The second groove portion is partially overlapped with the fourth groove portion from the free end. After extending a preset axial distance from the free end, the first groove portion and the second groove portion are partially overlapped with each other by forming an intersecting protrusion. The fifth groove portion is extended from the intermediate section toward the connection end. The first, second, third and fourth groove portions are extended to the fifth groove portion.

17 Claims, 11 Drawing Sheets

DRILL BIT STRUCTURE

BACKGROUND OF THE INVENTION

1. Field of the Invention

The present invention relates to a drill bit structure, particularly to a drill bit structure having five groove portions, which can drill holes on various workpieces, especially drill micro holes on circuit boards.

2. Description of the Prior Art

Figure 1:
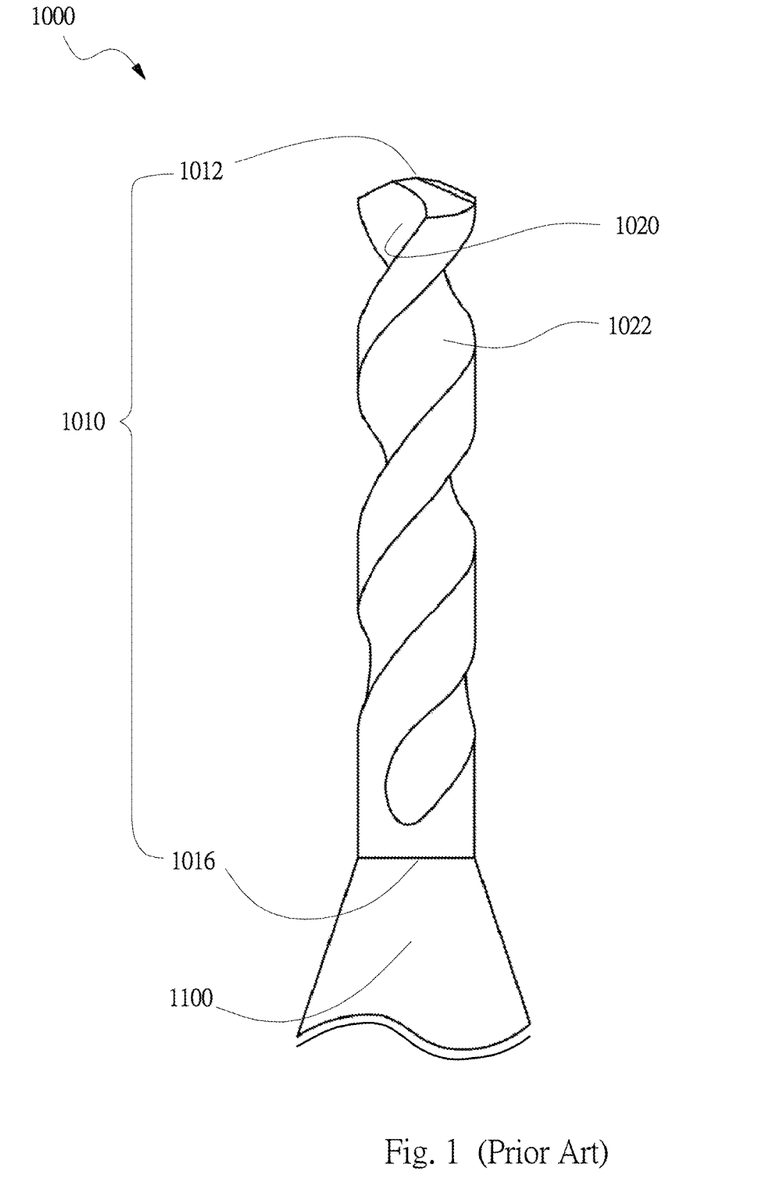
FIG. 1 is a front view schematically showing a conventional drill bit structure.
Figure 2:
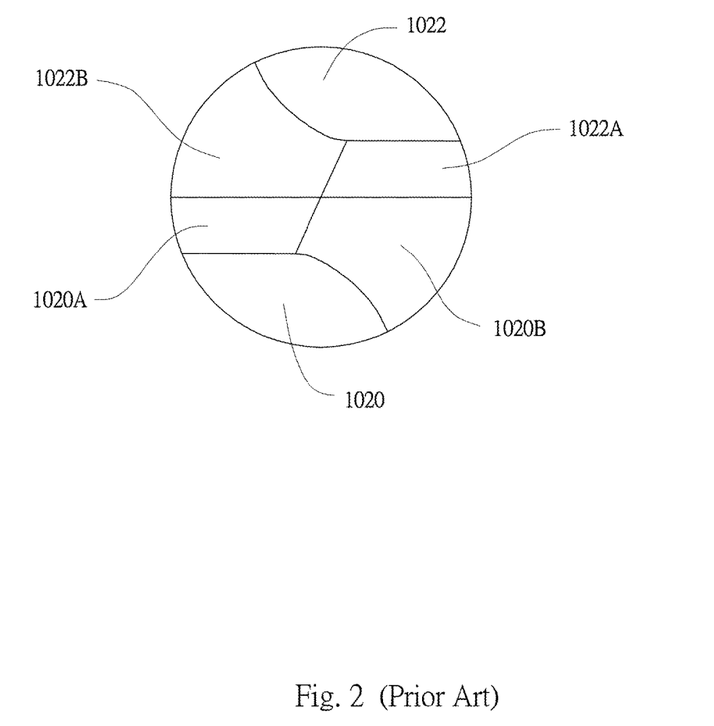
FIG. 2 is a top view schematically showing the conventional drill bit structure.
Figure 3:
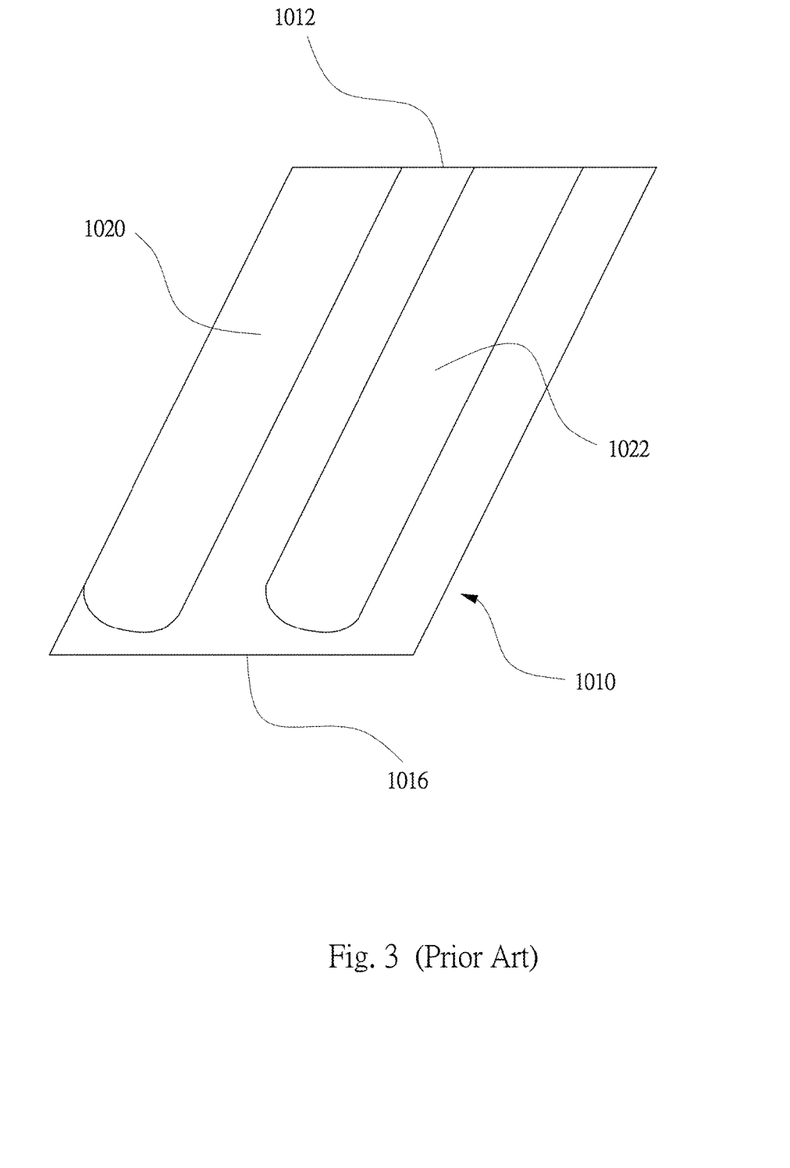
FIG. 3 is a diagram schematically showing the corresponding arrangement among the primary flutes of the conventional drill bit structure.

Referring to FIG. 1, a conventional drill bit structure is shown. The conventional drill bit 1000 has a bit 1010 and a shank 1100. The bit 1010 has a free end 1012 and a connection end 1016. The connection end 1016 is opposite to the free end 1012 and connected with the shank 1100. The bit 1010 only has two primary groove portions 1020, 1022 both helically extended from the free end 1012 toward the connection end 1016 without overlapping. Further, referring to FIG. 2, the conventional drill bit 1000 is simple-structured. The bit 1010 has two primary cutting portions 1020A, 1022A and two secondary cutting portions 1020B, 1022B, which are formed by the primary groove portions 1020, 1022. The bit 1010 also has two non-overlap chip discharge grooves/flutes, i.e. the two primary groove portions 1020, 1022. However, the two secondary cutting portions 1020B, 1022B, simply formed by the two primary groove portions 1020, 1022, have only a limited drilling/cutting effect. Further, referring to FIG. 3 schematically showing the arrangement/layout of the groove portions of the conventional drill bit 1000, the two non-overlap primary groove portions 1020, 1022 decrease the cross-sectional area of the bit 1010 and hence lower the stiffness of the bit 1010. Consequently, the lower-stiffness drill bit 1000 is unsuitable for high-strength or small-size/micro-size/size-miniaturization drilling processes. Besides, the bit 1010 has a uniform outer diameter, which causes unnecessary friction between the bit 1010 and the wall of the drilled hole, increases resistance of drilling and roughens the surface of the wall.

U.S. Pat. No. 7,018,143B2 disclosed a drill bit structure to overcome the abovementioned problems. The bit of the conventional drill bit structure has a head and a body. The head contacts a workpiece and drills the workpiece. The head has a larger diameter. The body has two primary groove portions/flutes extending from the head for guiding and discharging the chips generated by the drilling of the head. The body also has an annular groove/relief to make the body has a smaller outer diameter than the head so as to decrease the friction between the body of the bit and the drilled hole. Thereby, the quality of the drilled hole is improved.

China Patent No. 101791717B and Japan Patent Publication No. 2007307642A both disclosed a drill bit, which has two primary groove portions/flutes separately extending from the free end and then merged into a single integral chip discharge groove/flute so as to increase the cross-sectional area and stiffness of the bit. However, the merged chip discharge groove has a chip discharge space smaller than the original two separate primary groove portions. In this respect, the prior arts may have a problem of poor chip discharge.

Taiwanese Patent Publication No. 201338896 and China Utility Model No. 202028809U both disclosed a drill bit, which has two primary groove portions/flutes, two secondary groove portions/flutes and a bit annular groove/undercut/relief. The features of the two primary groove portions can be compared to that of China Patent No. 101791717B and Japan Patent Publication No. 2007307642A. The bit groove can be compared to the body groove of U.S. Pat. No. 7,018,143B2. Further, the two secondary groove portions enhance the overall performance of the drill bit. However, the prior arts also have a problem of poor chip discharge.

Although the abovementioned prior arts (Taiwanese Patent Publication No. 201338896, China Utility Model No. 202028809U, China Patent No. 101791717B, Japan Patent Publication No. 2007307642A) are characterized in overlapping two primary groove portions to increase the stiffness of the drill bit, they still have the problem of poor chip discharge. Moreover, the stiffness thereof is still insufficient for high-strength or small-size/micro-size/size-miniaturization drilling process.

SUMMARY OF THE INVENTION

One aspect of the present invention is to provide an improved drill bit structure to solve the abovementioned problems and improve the deficiencies of the prior arts. The drill bit structure of the present invention comprises a first groove portion and a second groove portion which can be compared to the two primary groove portions in the abovementioned prior arts. The first groove portion and the second groove portion are partially overlapped with each other by forming an intersecting protrusion. The partial overlap of the first groove portion and the second groove portion not only increases the cross-sectional area of the bit body but also avoids the over-reduction of the chip discharge space. Further, the intersecting protrusion among the partially overlapped first and second groove portions can increase the cross-sectional area of the bit body and enhance the stiffness of the bit body.

In one embodiment, the present invention proposes a drill bit structure, which comprises a body. The body includes a free end, an intermediate section and a connection end. The connection end is opposite to the free end, and the intermediate section is arranged between the free end and the connection end. A first largest outer diameter is provided in the region between the free end and the intermediate section. The body further includes a first groove portion, a second groove portion, a third groove portion, a fourth groove portion and a fifth groove portion. The first groove portion is a flute helically extended from the free end toward the connection end. The second groove portion is a flute arranged corresponding to the first groove portion and helically extended from the free end toward the connection end. After the first groove portion and the second groove portion are separately and respectively extended from the free end for a preset axial distance, the first groove portion and the second groove portion are partially overlapped with each other by forming an intersecting protrusion. Terminals of the first groove portion and the second groove portion respectively have a first contour and a second contour near the connection end. The first contour and the second contour are connected with each other by the intersecting protrusion. The third groove portion is a flute arranged between the first groove portion and the second groove portion. The third groove portion is helically extended from the free end toward the connection end. The third groove portion is partially overlapped with the first groove portion from the free end. The fourth groove portion is a flute arranged corresponding to the third groove portion and between the first groove portion and the second groove portion. The fourth groove portion is helically extended from the free end toward the connection end. The fourth groove portion is partially overlapped with the second groove portion from the free end. The fifth groove portion is an annular groove extended from the intermediate section toward the connection end. A second largest outer diameter is provided in the region between the intermediate section and the connection end. The second largest outer diameter is smaller than the first largest outer diameter. The first groove portion, the second groove portion, the third groove portion and the fourth groove portion are all extended to the fifth groove portion.

The objective, technologies, features and advantages of the present invention will become apparent from the following description in conjunction with the accompanying drawings wherein certain embodiments of the present invention are set forth by way of illustration and example.

BRIEF DESCRIPTION OF THE DRAWINGS

The foregoing conceptions and their accompanying advantages of this invention will become more readily appreciated after being better understood by referring to the following detailed description, in conjunction with the accompanying drawings, wherein.

DESCRIPTION OF THE PREFERRED EMBODIMENT

The detailed explanation of the present invention is described as follows. The described preferred embodiments and examples are presented for purposes of illustrations and description, and they are not intended to limit the scope of the present invention.

Figure 4:
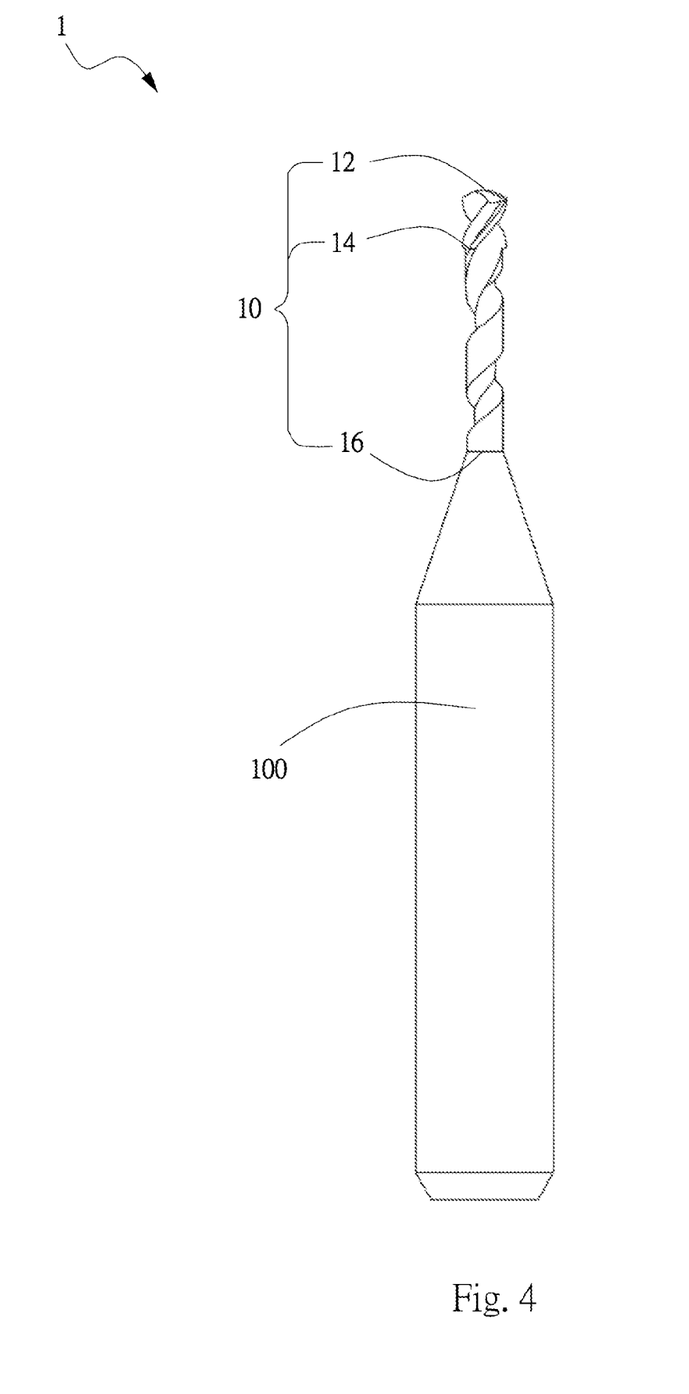
FIG. 4 is a front view schematically showing a drill bit structure according to one embodiment of the present invention.
Figure 5A:
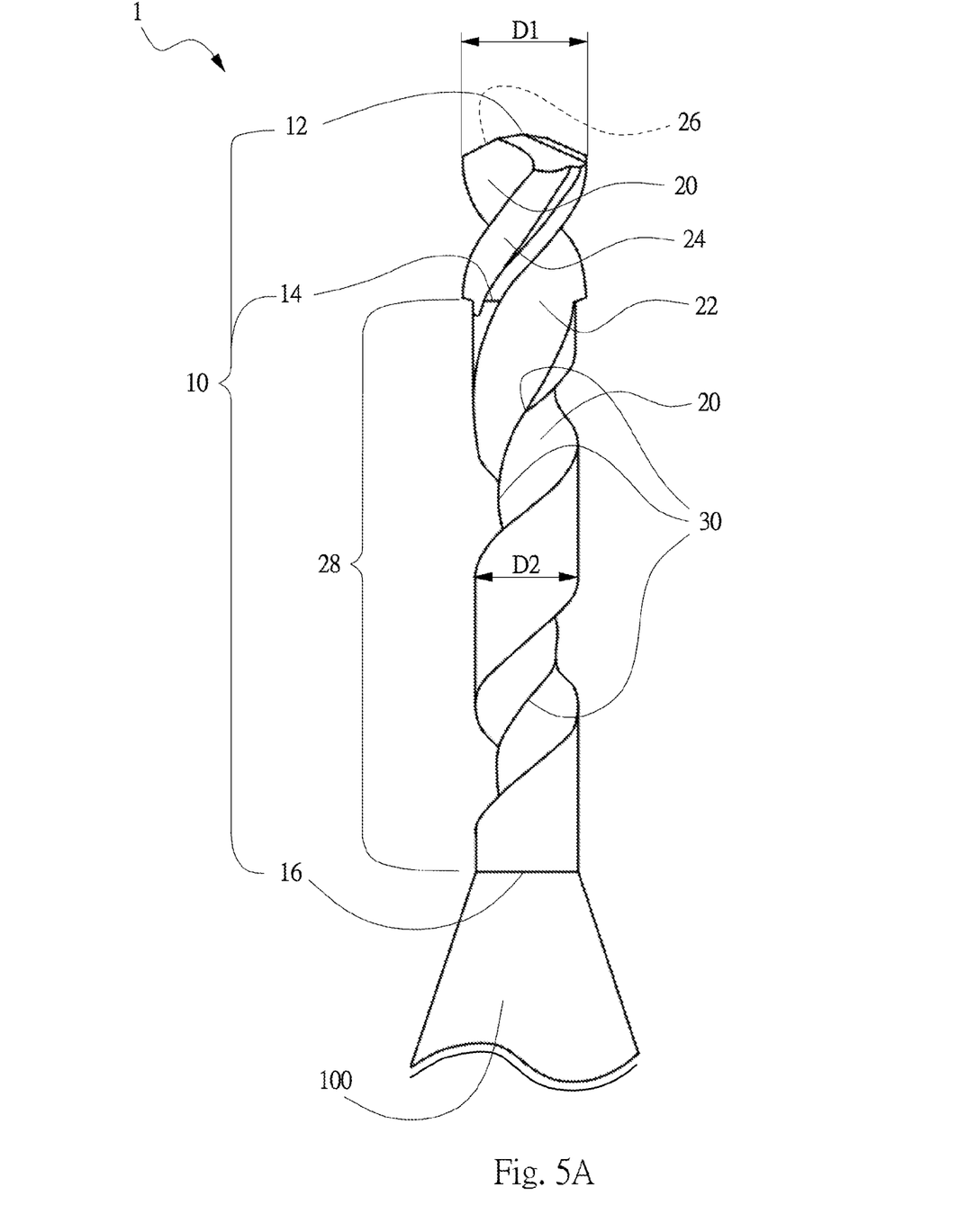
FIG. 5A is a front view schematically showing a body of a drill bit structure according to one embodiment of the present invention.
Figure 5B:
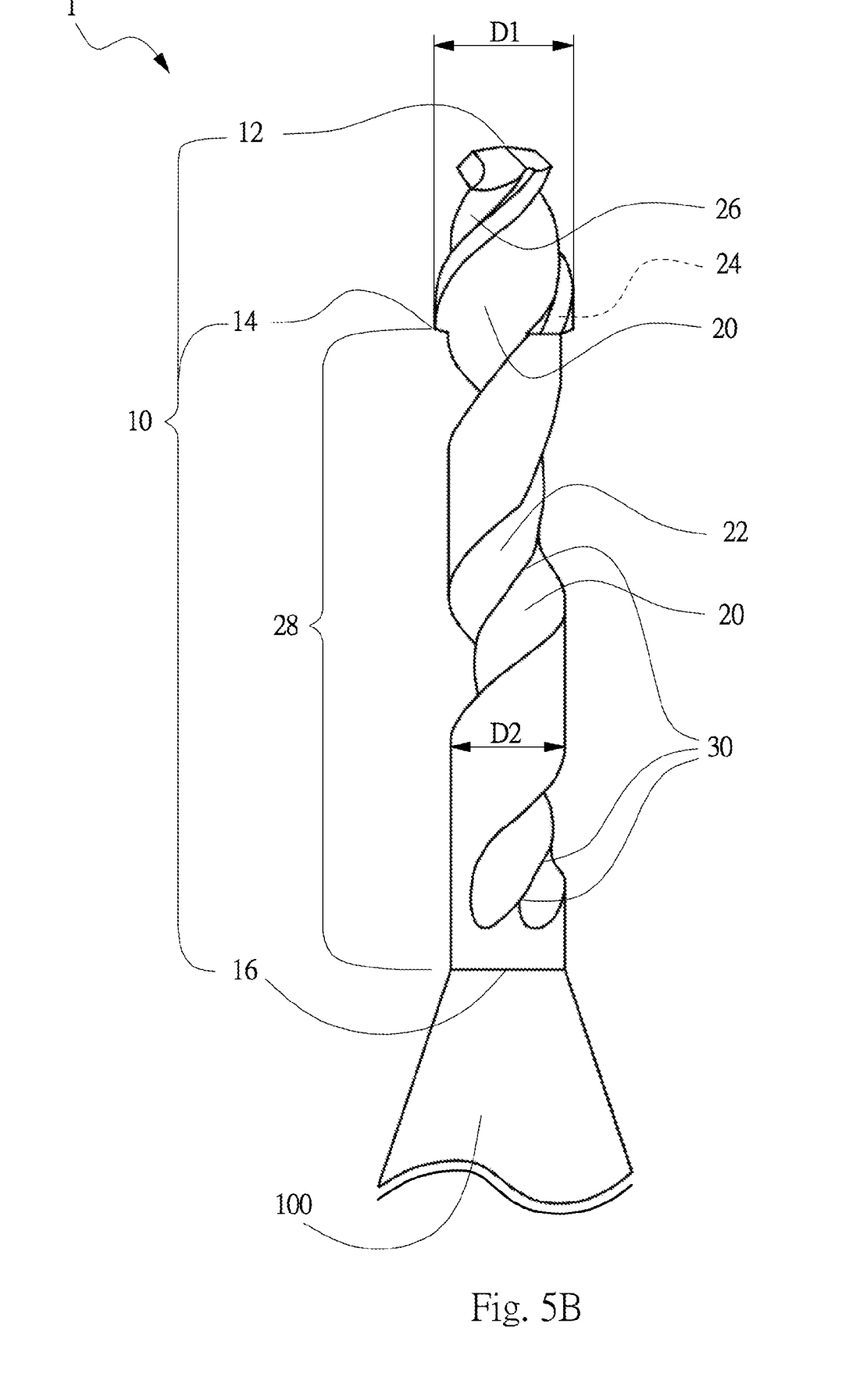
FIG. 5B is a side view schematically showing a body of a drill bit structure according to one embodiment of the present invention.
Figure 5C:
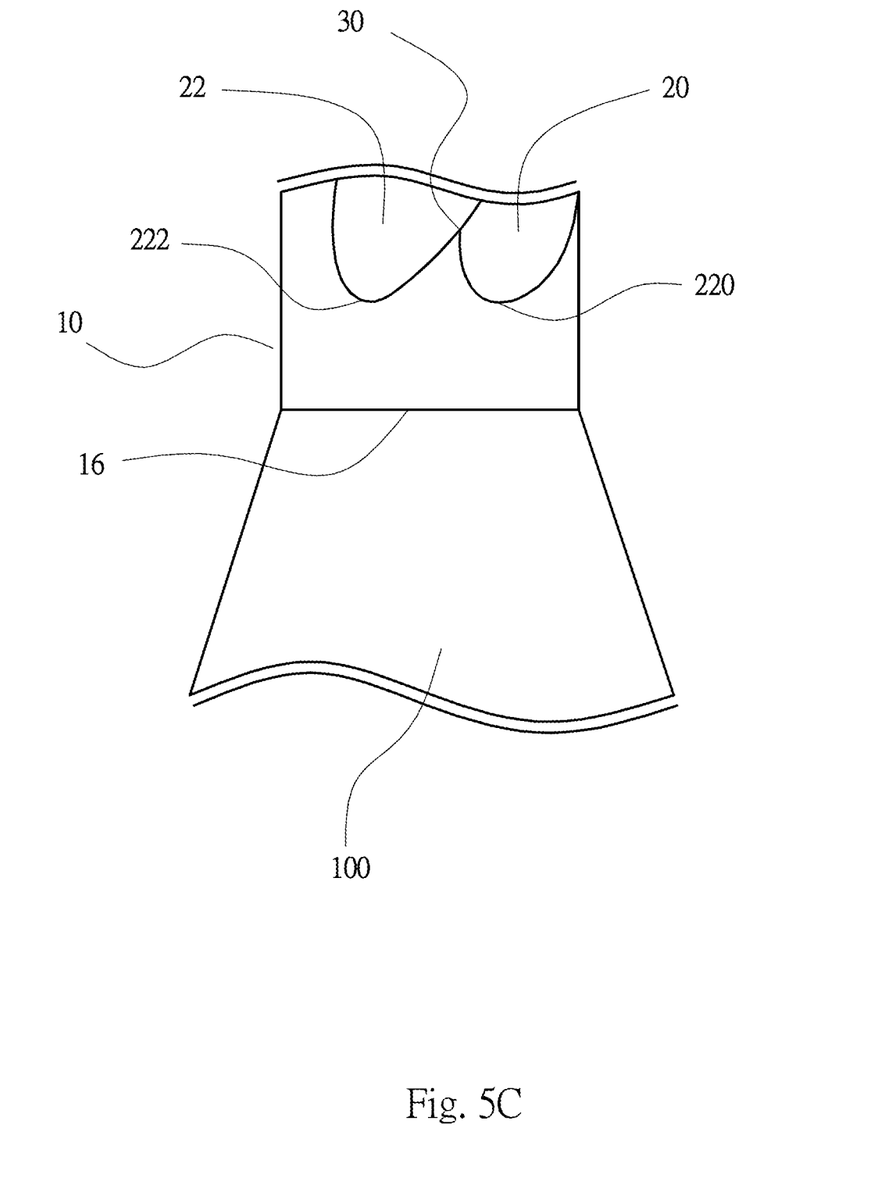
FIG. 5C is a locally-enlarged view of FIG. 5B and schematically shows the terminal regions of the first groove portion and the second groove portion of a drill bit structure according to one embodiment of the present invention.
Figure 6:
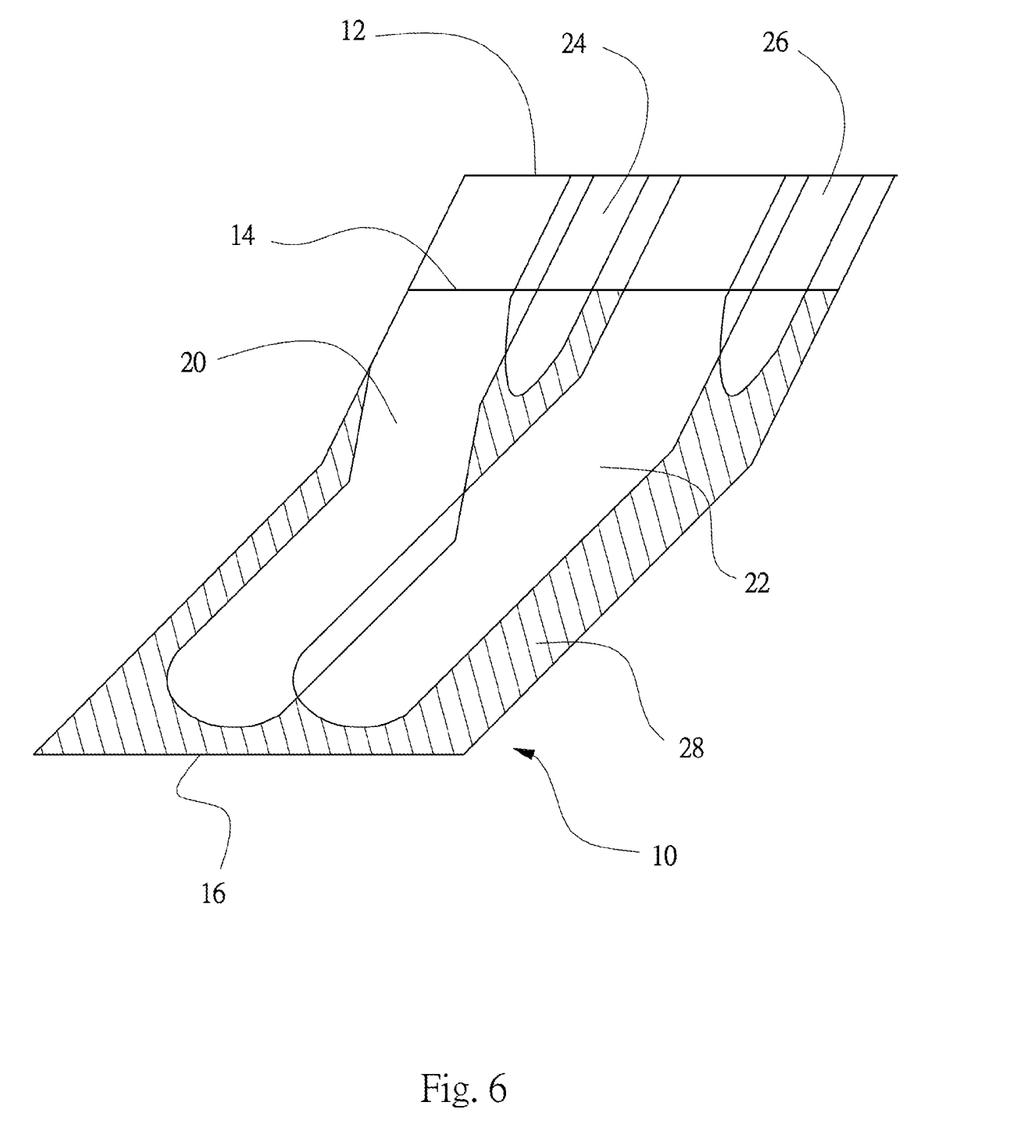
FIG. 6 is a diagram schematically showing the corresponding arrangement among a first groove portion, a second groove portion, a third groove portion, a fourth groove portion and a fifth groove portion of a drill bit structure according to one embodiment of the present invention.

Referring to FIG. 4, the overall view of a drill bit structure according to one embodiment of the present invention is shown. The drill bit structure 1 comprises a body 10 and a shank 100. The body 10 comprises a free end 12, an intermediate section 14 and a connection end 16. The intermediate section 14 is located between the free end 12 and the connection end 16. The connection end 16 is opposite to the free end 12 and connected with the shank 100. Referring to FIGS. 5A, 5B and 6, a first largest outer diameter D1 is provided in a region between the free end 12 and the intermediate section 14. The body 10 comprises a first groove portion 20, a second groove portion 22, a third groove portion 24, a fourth groove portion 26 and a fifth groove portion 28. The first groove portion 20 is a flute helically extended from the free end 12 toward the connection end 16. The second groove portion 22 is a flute arranged corresponding to the first groove portion 20 and helically extended from the free end 12 toward the connection end 16. After the first groove portion 20 and the second groove portion 22 are separately and respectively extended from the free end 12 for a preset axial distance, the first groove portion 20 and the second groove portion 22 are partially overlapped with each other by forming an intersecting protrusion 30. More specifically, referring to FIG. 5C, the terminals of the first groove portion 20 and the second groove portion 22, which are near the connection end 16, respectively have a first contour 220 and a second contour 222. The first contour 220 and the second contour 222 are connected with each other by the intersecting protrusion 30. Preferably, the first contour 220 and the second contour 222 respectively have a U shape or a V shape. More preferably, the first contour 220 and the second contour 222 are joined to form a W-shaped contour. The third groove portion 24 is a flute arranged between the first groove portion 20 and the second groove portion 22 and helically extended from the free end 12 toward the connection end 16. The third groove portion 24 is partially overlapped with the first groove portion 20 from the free end 12. The fourth groove portion 26 is a flute arranged corresponding to the third groove portion 24. The fourth groove portion 26 is arranged between the first groove portion 20 and the second groove portion 22 and helically extended from the free end 12 toward the connection end 16. The fourth groove portion 26 is partially overlapped with the second groove portion 22 from the free end 12. The fifth groove portion 28 is an annular groove extended from the intermediate section 14 toward the connection end 16, so that a second largest outer diameter D2, provided in the region between the intermediate section 14 and the connection end 16, is smaller than the first largest outer diameter D1. The first groove portion 20, the second groove portion 22, the third groove portion 24 and the fourth groove portion 26 are all extended to the fifth groove portion 28. In other words, the first groove portion 20, the second groove portion 22, the third groove portion 24 and the fourth groove portion 26 are respectively partially overlapped with the fifth groove portion 28. Preferably, the first largest outer diameter D1 ranges between 0.05 mm and 1.8 mm. Through the abovementioned arrangements among the first groove portion 20, the second groove portion 22, the third groove portion 24 and the fourth groove portion 26, the quality of drilling of the bit structure 1 is improved. Through the arrangement of the fifth groove portion 28, the friction between the body 10 of the drill bit structure 1 and the wall of a drilled hole is decreased. Through the partially overlapped arrangements among the first groove portion 20, the second groove portion 22, the third groove portion 24, the fourth groove portion 26 and the fifth groove portion 28, the volume of the body 10 or the area of any cross section of the body 10 is increased, and the stiffness of the body 10 is thus enhanced. In detail, when the first groove portion 20 and the second groove portion 22 are partially overlapped with each other by forming an intersecting protrusion 30, the volume of the body 10 or any cross section area of the body 10 can be increased, and thus the stiffness of the body 10 is enhanced. Further, when the intersecting protrusion 30 formed among the overlap region of the first groove portion 20 and the second groove portion 22, the first groove portion 20 and the second groove portion 22 are mutually formed an dual overlapped arc structure on the body 10. Wherein, the overlapped arc structures of the first groove portion 20 and the second groove portion 22 corresponding to the dual overlapped arc structure are respectively smaller than the non-overlapped arc structures of the first groove portion 20 and the second groove portion 22; wherein, the non-overlapped structure are defined in the condition that the first groove portion 20 and the second groove portion 22 are not overlapped. Thus, the stiffness of the body 10 is further enhanced. Furthermore, by the partially overlapped configuration of the first groove portion 20 and the second groove portion 22, the flutes/chip discharge grooves within the dual overlapped arc structure have appropriate space to discharge chips.

Figure 7:
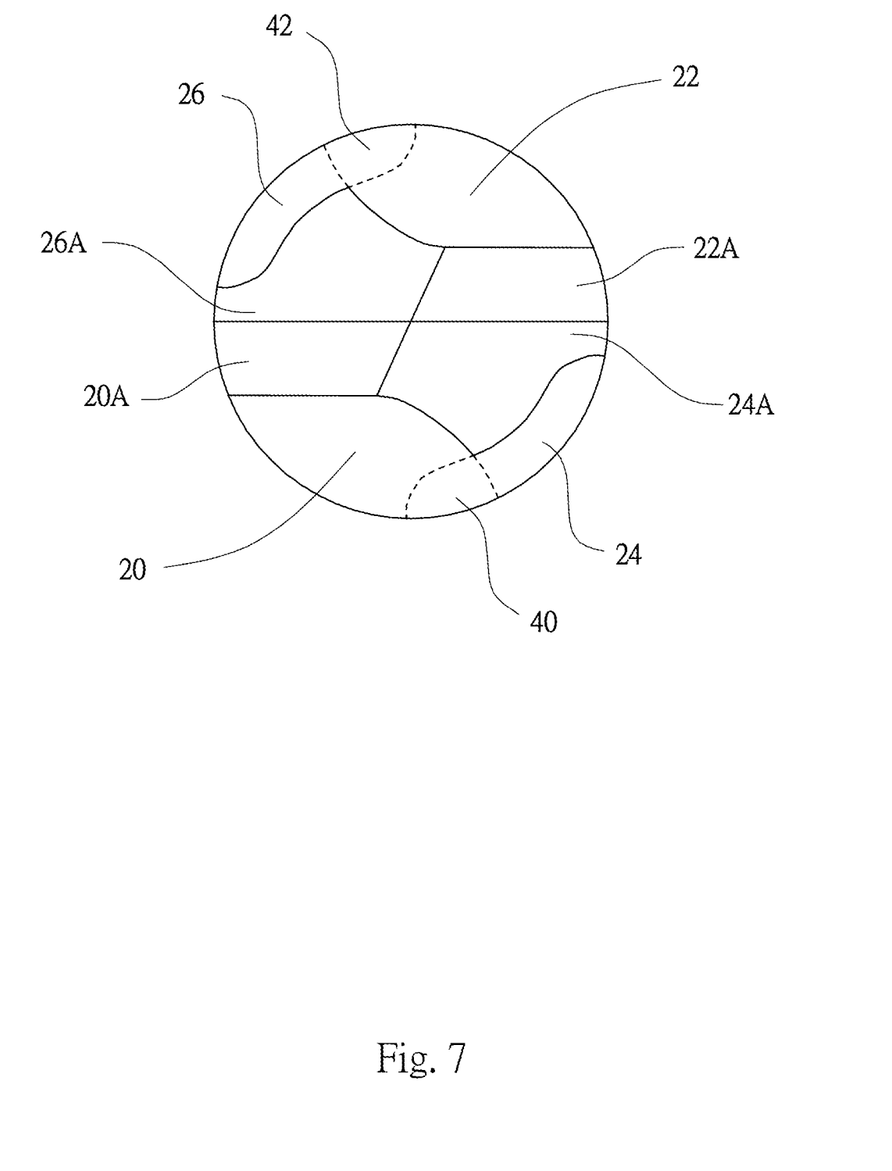
FIG. 7 is a top view schematically showing a drill bit structure according to one embodiment of the present invention.

More specifically, referring to FIGS. 5A, 5B and 7, the body 10 has a total axial length defined by the axial distance defined/measured from the free end 12 and the connection end 16. The first groove portion 20 is extended from the free end 12 toward the connection end 16 helically for a first axial distance to form a first primary cutting portion 20A and a first chip discharge groove/flute. Wherein, the first primary cutting portion 20A is formed between the free end 12 and the intermediate section 14. The first groove portion 20 is exactly the first chip discharge groove. The second groove portion 22 is extended from the free end 12 toward the connection end 16 helically for a second axial distance to form a second primary cutting portion 22A and a second chip discharge groove/flute. Wherein, the second primary cutting portion 22A is formed between the free end 12 and the intermediate section 14. The second groove portion 22 is exactly the second chip discharge groove. The third groove portion 24 is extended from the free end 12 toward the connection end 16 helically for a third axial distance to form a first secondary cutting portion 24A and a third chip discharge groove/flute. Wherein, the first secondary cutting portion 24A is formed between the free end 12 and the intermediate section 14. The third groove portion 24 is exactly the third chip discharge groove. The fourth groove portion 26 is extended from the free end 12 toward the connection end 16 helically for a fourth axial distance to form a second secondary cutting portion 26A and a fourth chip discharge groove/flute. Wherein, the second secondary cutting portion 26A is formed between the free end 12 and the intermediate section 14. The fourth groove portion 26 is exactly the fourth chip discharge groove. The fifth groove portion 28 is extended from the intermediate section 14 toward the connection end 16 for a fifth axial distance. Preferably, each of the first axial distance and the second axial distance ranges between 90% and 100% of the total axial length. Preferably, each of the third axial distance and the fourth axial distance ranges between 6% and 36% of the total axial length. Preferably, the fifth axial distance ranges between 70% and 95% of the total axial length. In one preferable embodiment, the first axial distance equals the second axial distance, and the third axial distance equals the fourth axial distance. In another preferable embodiment, each of the first axial distance and the second axial distance ranges between 1.0 mm and 12.0 mm, and each of the third axial distance and the fourth axial distance ranges between 0.3 mm and 1.5 mm. It should be noted that the connection end 16 defined in the present invention is not limited to connect with the shank 100. The connection end 16 is mainly used to define the total length of the body 10. Generally, a terminal axial distance exists between the connection end 16 and the groove portion having the longest axial distance, and the terminal axial distance ranges within one ninth of the longest axial distance. In a particular case, when the longest axial distance equals the length from the free end 12 to the connection end 16, the terminal axial distance is not exists.

The first groove portion 20 is partially overlapped with the third groove portion 24 from the free end 12 for a first axial length to form a first overlap region 40. The second groove portion 22 is partially overlapped with the fourth groove portion 26 from the free end 12 for a second axial length to form a second overlap region 42. Preferably, each of the first axial length and the second axial length ranges between 3% and 35% of the total axial length. Preferably, the preset axial distance ranges between 30% and 60% of the total axial length.

Figure 8:
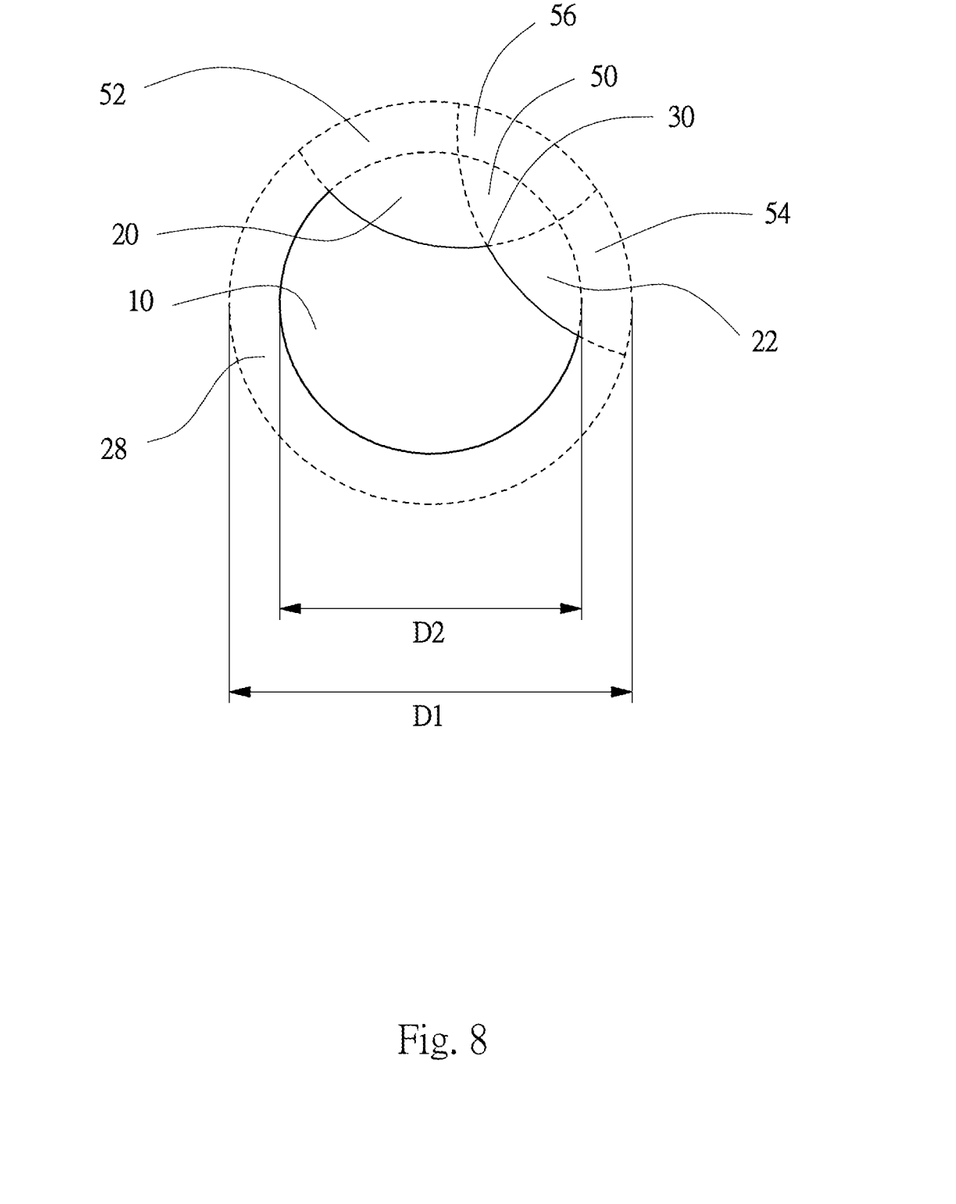
FIG. 8 is a sectional view schematically showing the partial overlap of a first groove portion and a second groove portion, and showing the relationship of them and a fifth groove portion according to one embodiment of the present invention.
Figure 9:
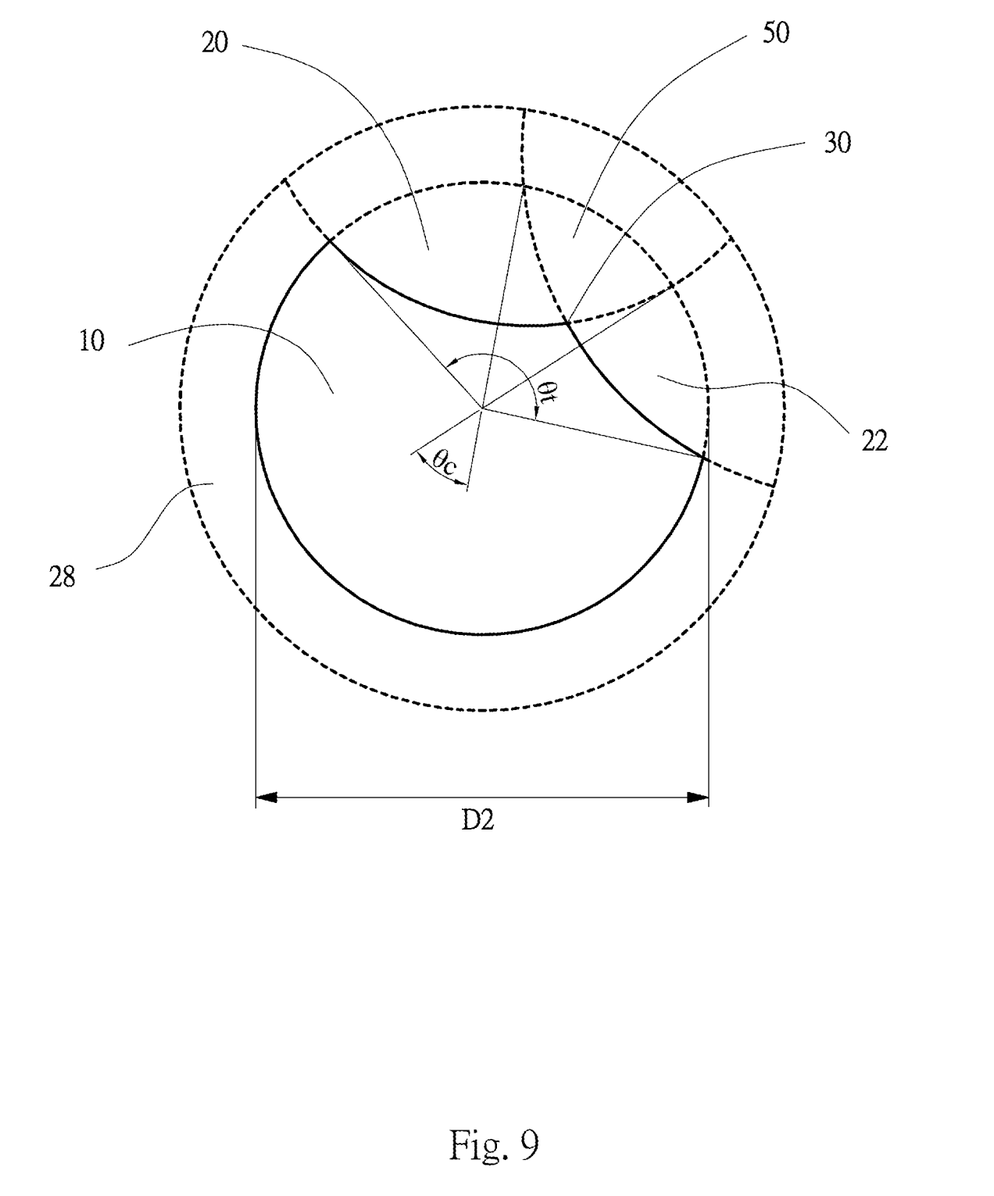
FIG. 9 is a diagram schematically showing a mutual overlap radian and a total overlap radian of a drill bit structure according to FIG. 8.

Referring to FIG. 8, a sectional view schematically showing the partial overlap of the first groove portion 20, the second groove portion 22 and the fifth groove portion 28 according to one embodiment of the present invention. The first groove portion 20 and the second groove portion 22 are partially overlapped with each other by forming the intersecting protrusion 30 and extended to the fifth groove portion 28 to form a third overlap region 50, a fourth overlap region 52, a fifth overlap region 54 and a sixth overlap region 56. The third overlap region 50 is a region that simply the first groove portion 20 and the second groove portion 22 are overlapped. The fourth overlap region 52 is a region that simply the first groove portion 20 and the fifth groove portion 28 are overlapped. The fifth overlap region 54 is a region that simply the second groove portion 22 and the fifth groove portion 28 are overlapped. The sixth overlap region 56 is a region that the first groove portion 20, the second groove portion 22 and the fifth groove portion 28 are overlapped. Wherein, the fifth groove portion 28 makes the body 10 have the second largest outer diameter D2 smaller than the first largest outer diameter D1, so that frictions among the wall of the drilled hole and the surface of the body 10 excluding the cutting portions (20A, 22A, 24A and 26A) are avoided. Referring to FIG. 9, the partial overlap of the first groove portion 20 and the second groove portion 22 define a mutual overlap radian θc and a total overlap radian θt. The mutual overlap radian θc is an included angle defined by the center of the body 10 and two points where the second largest diameter D2 is intersected with the boundary that the first groove portion 20 and the second portion 22 are overlapped. The first groove portion 20 is substantially overlapped with the second groove portion 22 while the mutual overlap radian θc is greater than 0. The total overlap radian θt is a maximum included angle defined by the center of the body 10 and two points where the second largest diameter D2 is intersected with the boundaries of the first groove portion 20 and the second groove portion 22. Preferably, the overlap of the first groove portion 20 and the second groove portion 22 defines a maximum mutual overlap radian and a corresponding total overlap radian. The maximum mutual overlap radian is the maximum included angle defined by the center of the body 10 and two points where the second largest diameter D2 is intersected with the boundary that the first groove portion 20 and the second groove portion 22 are overlapped. The corresponding total overlap radian is a maximum included angle corresponding to the maximum mutual overlap radian and defined by the center of the body 10 and two points where the second largest diameter D2 is intersected with the boundaries of the first groove portion 20 and the second groove portion 22. The maximum mutual overlap radian ranges between 10% and 60% of the corresponding total overlap radian. Thereby, the body 10 has better chip discharge effect and higher stiffness. Preferably, the maximum mutual overlap radian ranges between 25% and 40% of the corresponding total overlap radian. Thereby, the body 10 has the optimized chip discharge effect and stiffness.

More specifically, the first groove portion 20 and the second groove portion 22 respectively have a first primary flute depth and a second primary flute depth. The third groove portion 24 and the fourth groove portion 26 respectively have a first secondary flute depth and a second secondary flute depth. The fifth groove portion 28 has an annular groove depth. In one example, the first primary flute depth is greater than the first secondary flute depth; the second primary flute depth is greater than the second secondary flute depth; and each of the first secondary flute depth and the second secondary flute depth is greater than the annular groove depth. Preferably, each of the first primary flute depth and the second primary flute depth ranges between 0.01 mm and 0.8 mm. Each of the first secondary flute depth and the second secondary flute depth ranges between 0.005 mm and 0.05 mm. The annular groove depth ranges between 0.004 mm and 0.02 mm. In another example, each of the first primary flute depth and the second primary flute depth is gradually decreased from the free end 12 to the connection end 16, whereby the first groove portion 20 has a largest first primary flute depth at the free end 12 and a smallest first primary flute depth near the connection end 16, and the second groove portion 22 has a largest second primary flute depth at the free end 12 and a smallest second primary flute depth near the connection end 16. Wherein the largest first primary flute depth is greater than the first secondary flute depth; the largest second primary flute depth is greater than the second secondary flute depth; and each of the first secondary flute depth and the second secondary flute depth is greater than the annular groove depth. Via gradually decreasing the first primary flute depth and the second primary flute depth, the cross-sectional area the body 10 of the drill bit structure 1 is gradually increased toward the connection end 16. Thus, the stiffness of the body 10 is enhanced. It should be noted that the expression "gradually decrease" defined in the present invention includes "continuously decrease" and "non-continuously decrease". In the case of "continuously decrease", for example, each of the first primary flute depths near the connection end 16 is smaller than each of the first primary flute depths near the free end 12. That is to say, the first primary flute depth more close the connection end 16 is smaller. In the case of "non-continuously decrease", for example, the first primary flute depth at the free end 12 is greater than the first primary flute depth at the connection end 16, and at least one segment of the first primary flute depth, which is between the free end 12 and the connection end 16, has a uniform depth.

In further another example, the first primary flute depth is larger than the second primary flute depth; the second primary flute depth is larger than the first secondary flute depth; the first secondary flute depth is larger than the second secondary flute depth; and the second secondary flute depth is larger than the annular groove depth. Compare this exampled drill bit structure with a reference drill bit structure, where the first primary flute depth is the same as the second primary flute depth, and the first secondary flute depth is the same as the second secondary flute depth, based on the same first primary depth, the drill bit structure of this example of the present invention, which has varying flute depths, has a larger cross-sectional area of the body 10 than the reference drill bit structure. Therefore, the body 10 of the drill bit structure 1 of the present invention has a higher stiffness.

It should be noted that the length, depth, distance and diameter mentioned in the specification can be adjusted by an increment or decrement of 0.001 mm. For example, the first largest diameter D1 may be one of the values of 0.05 mm, 0.051 mm, 0.052 mm . . . 0.179 mm and 0.18 mm. In other words, the values of the first largest diameter D1 are distributed in a range from 0.05 mm to 0.18 mm in the form of an arithmetic sequence with a common difference of 0.001 mm. Similarity, the value relative to the angle mentioned in the specification can be adjusted by an increment or decrement of 0.01 degrees; and the value relative to the proportion mentioned in the specification can be adjusted by an increment or decrement of 1%.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:
1. A drill bit structure comprising:
   a body including a free end, an intermediate section and a connection end, said intermediate section located between said free end and said connection end, said connection end arranged opposite to said free end, a first largest outer diameter provided in a region between said free end and said intermediate section, wherein said body has a total axial length defined by an axial distance from said free end to said connection end, and said body further comprising:
      a first groove portion which is a flute helically extended from said free end toward said connection end;
      a second groove portion which is a flute arranged opposite to said first groove portion and helically extended from said free end toward said connection end; after said first groove portion and said second groove portion are separately and respectively extended from said free end for a preset axial distance, said first groove portion and said second groove portion are partially overlapped with each other by forming an intersecting protrusion; terminals of said first groove portion and said second groove portion respectively having a first contour and a second contour near said connection end, and said first contour and said second contour connected with each other by said intersecting protrusion;
      a third groove portion which is a flute arranged between said first groove portion and said second groove portion, said third groove portion helically extended from said free end toward said connection end for a third axial distance and partially overlapped with said first groove portion from said free end for a first axial length, wherein said third axial distance ranges between 6% and 36% of said total axial length and said first axial length ranges between 3% and 35% of said total axial length;

a fourth groove portion which is a flute arranged opposite to said third groove portion and between said first groove portion and said second groove portion, said fourth groove portion helically extended from said free end toward said connection end for a fourth axial distance and partially overlapped with said second groove portion from said free end for a second axial length, wherein said fourth axial distance ranges between 6% and 36% of said total axial length and said second axial length ranges between 3% and 35% of said total axial length; and a fifth groove portion which is an annular groove extended from said intermediate section toward said connection end for a fifth axial distance, a second largest outer diameter provided in a region between said intermediate section and said connection end, said second largest outer diameter smaller than said first largest outer diameter; said first groove portion, said second groove portion, said third groove portion and said fourth groove portion extended to said fifth groove portion, wherein said fifth axial distance ranges between 70% and 95% of said total axial length.

2. The drill bit structure according to claim 1, wherein said first contour and said second contour are joined to form a W-shaped contour.

3. The drill bit structure according to claim 1, wherein said first groove portion is helically extended from said free end toward said connection end for a first axial distance, said second groove portion is helically extended from said free end toward said connection end for a second axial distance, each of said first axial distance and said second axial distance ranges between 90% and 100% of said total axial length.

4. The drill bit structure according to claim 3, wherein said preset axial distance ranges between 30% and 60% of said total axial length.

5. The drill bit structure according to claim 3, wherein said first axial distance equals said second axial distance, said third axial distance equals said fourth axial distance.

6. The drill bit structure according to claim 5, wherein said first axial distance and said second axial distance range between 1.0 mm and 12.0 mm, said third axial distance and said fourth axial distance range between 0.3 mm and 1.5 mm.

7. The drill bit structure according to claim 1, wherein partial overlap of said first groove portion and said second groove portion defines a maximum mutual overlap radian and a corresponding total overlap radian, said maximum mutual overlap radian is a maximum included angle defined by a center of said body and two points where said second largest diameter is intersected with a boundary that said first groove portion and said second groove portion are overlapped, said corresponding total overlap radian is a maximum included angle corresponding to said maximum mutual overlap radian and defined by said center of said body and two points where said second largest diameter is intersected with boundaries of said first groove portion and said second groove portion, and said maximum mutual overlap radian ranges between 25% and 40% of said corresponding total overlap radian.

8. The drill bit structure according to claim 1, wherein said first largest outer diameter ranges between 0.05 mm and 1.8 mm.

9. The drill bit structure according to claim 3, wherein said first largest outer diameter ranges between 0.05 mm and 1.8 mm.

10. The drill bit structure according to claim 7, wherein said first largest outer diameter ranges between 0.05 mm and 1.8 mm.

11. The drill bit structure according to claim 1, wherein said first groove portion and said second groove portion respectively have a first primary flute depth and a second primary flute depth, said third groove portion and said fourth groove portion respectively have a first secondary flute depth and a second secondary flute depth, said fifth groove portion has an annular groove depth, said first primary flute depth is greater than said first secondary flute depth, said second primary flute depth is greater than said second secondary flute depth, each of said first secondary flute depth and said second secondary flute depth is greater than said annular groove depth.

12. The drill bit structure according to claim 3, wherein said first groove portion and said second groove portion respectively have a first primary flute depth and a second primary flute depth, said third groove portion and said fourth groove portion respectively have a first secondary flute depth and a second secondary flute depth, said fifth groove portion has an annular groove depth, said first primary flute depth is greater than said first secondary flute depth, said second primary flute depth is greater than said second secondary flute depth, each of said first secondary flute depth and said second secondary flute depth is greater than said annular groove depth.

13. The drill bit structure according to claim 7, wherein said first groove portion and said second groove portion respectively have a first primary flute depth and a second primary flute depth, said third groove portion and said fourth groove portion respectively have a first secondary flute depth and a second secondary flute depth, said fifth groove portion has an annular groove depth, said first primary flute depth is greater than said first secondary flute depth, said second primary flute depth is greater than said second secondary flute depth, each of said first secondary flute depth and said second secondary flute depth is greater than said annular groove depth.

14. The drill bit structure according to claim 11, wherein each of said first primary flute depth and second primary flute depth ranges between 0.01 mm and 0.8 mm; said first secondary flute depth and second secondary flute depth ranges between 0.005 mm and 0.05 mm; said annular groove depth ranges between 0.004 mm and 0.02 mm.

15. The drill bit structure according to claim 1, wherein said first groove portion and said second groove portion respectively have a first primary flute depth and a second primary flute depth, said third groove portion and said fourth groove portion respectively have a first secondary flute depth and a second secondary flute depth, said fifth groove portion has an annular groove depth, said first primary flute depth and said second primary flute depth are gradually decreased from said free end toward said connection end, so that said first primary flute depth and said second primary depth respectively have a largest first primary flute depth and a largest second primary flute depth at said free end, and said first primary flute depth and said second primary depth respectively have a smallest first primary flute depth and a smallest second primary flute depth near said connection end, and wherein said largest first primary flute depth is larger than said first secondary flute depth, said largest second primary flute depth is larger than said second secondary flute depth, each of said first secondary flute depth and said second secondary flute depth is greater than said annular groove depth.

16. The drill bit structure according to claim 3, wherein said first groove portion and said second groove portion respectively have a first primary flute depth and a second primary flute depth, said third groove portion and said fourth groove portion respectively have a first secondary flute depth and a second secondary flute depth, said fifth groove portion has an annular groove depth, said first primary flute depth and said second primary flute depth are gradually decreased from said free end toward said connection end, so that said first primary flute depth and said second primary depth respectively have a largest first primary flute depth and a largest second primary flute depth at said free end, and said first primary flute depth and said second primary depth respectively have a smallest first primary flute depth and a smallest second primary flute depth near said connection end, and wherein said largest first primary flute depth is larger than said first secondary flute depth, said largest second primary flute depth is larger than said second secondary flute depth, each of said first secondary flute depth and said second secondary flute depth is greater than said annular groove depth.

17. The drill bit structure according to claim 7, wherein said first groove portion and said second groove portion respectively have a first primary flute depth and a second primary flute depth, said third groove portion and said fourth groove portion respectively have a first secondary flute depth and a second secondary flute depth, said fifth groove portion has an annular groove depth, said first primary flute depth and said second primary flute depth are gradually decreased from said free end toward said connection end, so that said first primary flute depth and said second primary depth respectively have a largest first primary flute depth and a largest second primary flute depth at said free end, and said first primary flute depth and said second primary depth respectively have a smallest first primary flute depth and a smallest second primary flute depth near said connection end, and wherein said largest first primary flute depth is larger than said first secondary flute depth, said largest second primary flute depth is larger than said second secondary flute depth, each of said first secondary flute depth and said second secondary flute depth is greater than said annular groove depth.

* * * * *